US011932486B2

(12) United States Patent
Boivin et al.

(10) Patent No.: US 11,932,486 B2
(45) Date of Patent: Mar. 19, 2024

(54) MECHANICAL ARM SYSTEM FOR COLLECTING GARBAGE FROM A GARBAGE CONTAINER

(71) Applicant: The Heil Co., Chattanooga, TN (US)

(72) Inventors: Claude Boivin, Lévis (CA); Eric Boivin, Québec (CA); Hugo Marsan, Drummondville (CA)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 17/736,461

(22) Filed: May 4, 2022

(65) Prior Publication Data

US 2022/0315329 A1 Oct. 6, 2022

Related U.S. Application Data

(63) Continuation of application No. 16/635,757, filed as application No. PCT/CA2018/050969 on Aug. 10, 2018, now Pat. No. 11,332,308.

(Continued)

(51) Int. Cl.
*B65F 3/08* (2006.01)
*B65F 3/02* (2006.01)

(52) U.S. Cl.
CPC .......... *B65F 3/08* (2013.01); *B65F 2003/023* (2013.01); *B65F 2003/0266* (2013.01); *B65F 2003/0276* (2013.01)

(58) Field of Classification Search
CPC ................ B65F 3/08; B65F 2003/0276; B65F 2003/0266; B65F 2003/023
See application file for complete search history.

(56) References Cited

U.S. PATENT DOCUMENTS 2,592,085 A 4/1952 Van Doorne
2,592,324 A 4/1952 Oliver et al.

(Continued)

FOREIGN PATENT DOCUMENTS

CN 201284099 8/2009
CN 104016049 9/2014

(Continued)

OTHER PUBLICATIONS

International Preliminary Report on Patentability in International Appln. No. PCT/CA2018/050969, dated Feb. 27, 2020, 9 pages.

(Continued)

*Primary Examiner* — Glenn F Myers
(74) *Attorney, Agent, or Firm* — Fish & Richardson P.C.

(57) ABSTRACT

The mechanical arm system can include a garbage container holder and at least one mast. The holder can have guiding wheels engaged with adjacent tracks of the mast, the two adjacent tracks both having a lower portion extending upwardly along the mast, the lower portion of the first track being located forwardly of the lower portion of the second track, the lower portion of both tracks leading into corresponding upper portions which are curved rearwardly. The system can have a primary mast and a secondary mast slidably mounted to the primary mast, with the garbage container slidable mounted to the secondary mast. A driving link can simultaneously connect the primary mast to the secondary mast, and the secondary mast to the holder in a manner that when the driving link is moved, both sliding movements are performed in the same direction.

19 Claims, 10 Drawing Sheets

Related U.S. Application Data

(60) Provisional application No. 62/544,981, filed on Aug. 14, 2017.

(56) References Cited

U.S. PATENT DOCUMENTS

| | | | | |
|---|---|---|---|---|
| 2,788,135 | A | 8/1955 | Girotti | |
| 4,057,156 | A | 11/1977 | Thompson et al. | |
| 4,219,298 | A * | 8/1980 | Stragier | B65F 3/08 414/544 |
| 4,597,710 | A | 7/1986 | Kovats | |
| 5,007,786 | A | 4/1991 | Bingman | |
| 5,044,863 | A | 9/1991 | Labass | |
| 5,163,805 | A | 11/1992 | Mezey | |
| 5,393,180 | A | 2/1995 | Van Den Aarsen | |
| 5,702,225 | A * | 12/1997 | Ghibaudo | B65F 3/08 414/408 |
| 5,813,818 | A | 9/1998 | McNeilus et al. | |
| 6,071,058 | A | 6/2000 | Tetz et al. | |
| 6,491,489 | B1 * | 12/2002 | Stragier | B65F 3/08 414/409 |
| 6,494,665 | B1 | 12/2002 | Bingman | |
| 8,511,325 | B2 | 8/2013 | Gingras | |
| 8,534,977 | B2 | 9/2013 | Rowland et al. | |
| 9,403,641 | B1 | 8/2016 | Ghibaudo | |
| 9,834,377 | B1 * | 12/2017 | Hayes | B65F 3/041 |
| 11,332,308 | B2 | 5/2022 | Boivin et al. | |
| 2005/0092530 | A1 * | 5/2005 | Rice | G01G 23/3728 177/136 |
| 2013/0039728 | A1 | 2/2013 | Price et al. | |
| 2016/0159571 | A1 | 6/2016 | Arrez | |
| 2016/0207708 | A1 | 7/2016 | Schell | |
| 2017/0297818 | A1 * | 10/2017 | Goedken | B65F 3/08 |
| 2018/0134487 | A1 * | 5/2018 | McNeilus | B65F 3/041 |
| 2021/0122568 | A1 | 4/2021 | Boivin et al. | |

FOREIGN PATENT DOCUMENTS

| | | |
|---|---|---|
| DE | 19905933 | 8/2000 |
| DE | 102008013940 | 9/2009 |
| JP | H0692404 | 4/1994 |

OTHER PUBLICATIONS

International Search Report and Written Opinion in International Appln. No. PCT/CA2018/050969, dated Nov. 5, 2018, 13 pages.

Invitation to Pay Additional Fees in International Appln. No. PCT/CA2018/050969, dated Aug. 27, 2018, 2 pages.

* cited by examiner

MECHANICAL ARM SYSTEM FOR COLLECTING GARBAGE FROM A GARBAGE CONTAINER

CROSS-REFERENCE TO RELATED APPLICATIONS

This application is a continuation of U.S. patent application Ser. No. 16/635,757, filed on Jan. 31, 2020, which is a National Stage Application under 35 USC § 371 and claims the benefit of International Patent Application No. PCT/CA2018/050969, filed on Aug. 10, 2018, which claims the benefit of U.S. Provisional Patent Application No. 62/544,981, filed on Aug. 14, 2017, which are incorporated herein by reference in their entirety.

BACKGROUND

Known mechanical arms for performing automated collection of garbage bins and dumping of the content of the garbage bins in a container of a corresponding garbage collection truck have been satisfactory to a certain degree, but there remains room for improvement. For instance, some mechanical arms performing automated collection of garbage tend to suffer from efficiency or durability issues, i.e. they tend to be subject to high failure rates as a result of designs which were not strong enough to withstand the high number of cycles and the heavy loads involved and required more maintenance than what was desired. In some cases, mechanical arms which are designed to achieve high performances in terms of cycle time, versatility and/or durability, may suffer from high manufacturing costs.

In view of the above, there is a need for an improved mechanical arm for a garbage collection truck performing automated garbage collection from a garbage bin which, by virtue of its design and components, would be able to overcome or at least minimize some of the above-discussed prior art concerns.

SUMMARY

The mechanical arm system can include a garbage container holder and at least one mast. The holder can have guiding wheels engaged with adjacent tracks of the mast, the two adjacent tracks both having a lower portion extending upwardly along the mast, the lower portion of the first track being located forwardly of the lower portion of the second track, the lower portion of both tracks leading into corresponding upper portions which are curved rearwardly. The system can have a primary mast and a secondary mast slidably mounted to the primary mast, with the garbage container slidable mounted to the secondary mast. A driving link can simultaneously connect the primary mast to the secondary mast, and the secondary mast to the holder in a manner that when the driving link is moved, both sliding movements are performed in the same direction.

In accordance with one aspect, there is provided a mechanical arm system for collecting garbage from a garbage container, the mechanical arm system comprising: a garbage container holder having two guiding wheels at a rear thereof, the garbage container being held at a front of the garbage container holder; a mast having two adjacent tracks each receiving a corresponding wheel to guide the movement thereof, the two adjacent tracks both having a lower portion extending upwardly along the mast, the lower portion of the first track being located forwardly of the lower portion of the second track, the lower portion of both tracks leading into corresponding upper portions which are curved rearwardly in a manner that the garbage container holder can be raised along the lower portion of the tracks and into the upper portion of the tracks, the garbage container being tilted upside down to empty its contents behind the mast as it is conveyed along the upper portions of the tracks.

In accordance with another aspect, there is provided a mechanical arm system for collecting garbage from a garbage container, the mechanical arm system comprising: a primary mast; a secondary mast slidably mounted to the primary mast; a garbage container holder slidably mounted to the secondary mast, a driving link connecting the primary mast to the secondary mast, and also connecting the garbage container holder to the secondary mast, a drive motor connected to drive the driving link in a manner that when the drive motor is operated, the driving link simultaneously slides the secondary mast along the primary mast, and slides the garbage container holder along the secondary mast, both sliding movements being in the same one of an upwards or downwards orientation, depending of a direction of operation of the drive motor.

In accordance with one aspect, there is provided a mechanical arm for a garbage collection truck performing automated garbage collection from a garbage bin. The mechanical arm comprises a grabber assembly, a vertical displacement section and a horizontal displacement section. The grabber assembly has a main body and wheels rotatably mounted to the main body and projecting therefrom. The grabber assembly is selectively engageable with the garbage bin to grasp the garbage bin, temporarily hold the garbage bin and subsequently release the garbage bin. The vertical displacement section comprises a multi-stage mast and a vertical actuation mechanism. The multi-stage mast extends substantially along a vertical axis and comprises a terminal mast section having a body with a terminal mast section guiding track defined therein. The terminal mast section guiding track includes a substantially straight lower portion and a consecutive curved upper portion. The grabber assembly is slidably movable on the terminal mast section with the wheels rotatably mounted to the main body of the grabber assembly being engaged in the terminal mast section guiding track. The vertical actuation mechanism drives sections of the multi-stage mast to slide onto one another and drives the grabber assembly to slide on the terminal mast section, with the wheels rotatably mounted to the main body of the grabber assembly moving along the guiding track of the terminal mast section. The horizontal displacement section extends substantially along a horizontal axis and is operatively connected to the grabber assembly to selectively move the grabber assembly substantially horizontally In accordance with another aspect, there is provided a mechanical arm system for collecting garbage from a garbage container, the mechanical arm system comprising: a mast; a grabber assembly configured to selectively grab or release the garbage container; a sliding engagement between the grabber assembly and the mast, the sliding engagement providing a sliding path along which raising or lowering movement of the grabber assembly relative to the mast is guided, the sliding engagement including a first track provided along the mast, and a first wheel rotatably mounted to the grabber assembly, the first wheel engaged with the first track, a second track provided along the mast, the second track extending adjacent to the first track, and a second wheel rotatably mounted to the grabber assembly, the second wheel engaged with the second track, the first and second tracks having a lower portion being oriented in a vertical orientation, the grabber assembly being in front of the mast when the first wheel and second wheel are in the lower portion, the lower portion of the first and second tracks extending continuously to a respective upper portion of the first and second tracks, the upper portion of both the first and second tracks being curved rearwardly; an actuator to move the grabber assembly along the sliding path of the mast, in a manner that when the first wheel and second wheel reach and are moved along the upper portion of the corresponding tracks, the garbage container grabbed by the grabber assembly is tilted upside-down to empty its contents towards the rear.

In accordance with another aspect, there is provided a mechanical arm system for collecting garbage from a garbage container, the mechanical arm system comprising: a primary mast; a secondary mast; a first sliding engagement between the primary mast and the secondary mast, the first sliding engagement providing a first sliding path along which raising or lowering movement of the secondary mast along the primary mast is guided; a grabber assembly configured to selectively grab or release the garbage container; a second sliding engagement between the grabber assembly and the secondary mast, the second sliding engagement providing a second sliding path along which raising or lowering movement of the grabber assembly along the secondary mast is guided; linking chains connecting the grabber assembly to the secondary mast, and the secondary mast to the primary mast, a drive motor connected to the linking chains via a sprocket and operable in a manner to simultaneously raise or lower both i) the secondary mast along the primary mast via the linking chains and the first sliding engagement and ii) the grabber assembly along the secondary mast via the linking chains and the second sliding engagement.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
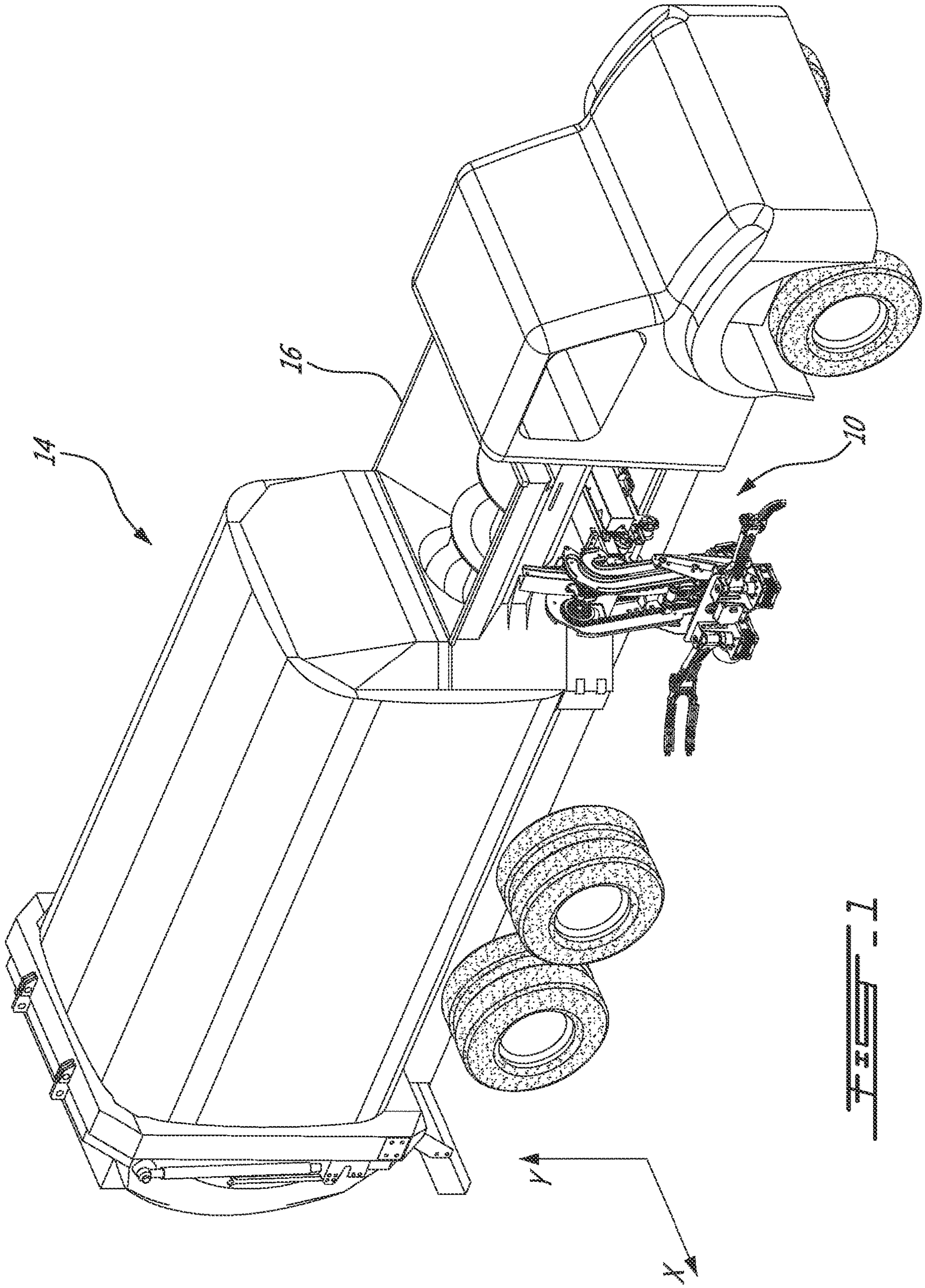
FIG. 1 is an oblique view of the mechanical arm shown secured to a garbage collection truck.

Referring generally to FIG. 1, in accordance with an embodiment, there is provided a mechanical arm 10 mountable to a garbage collection truck 14 to define an automated side loader (ASL) garbage truck performing automated collection of garbage from a garbage receptacle, generally referred to herein as a garbage bins 12 or garbage container. The mechanical arm 10 is designed to provide automated garbage collection with smooth, constant movement (i.e. movement that has minimal jerk/shock) thereby resulting in limited shock stress on the components and leading to high durability.

Figure 2:
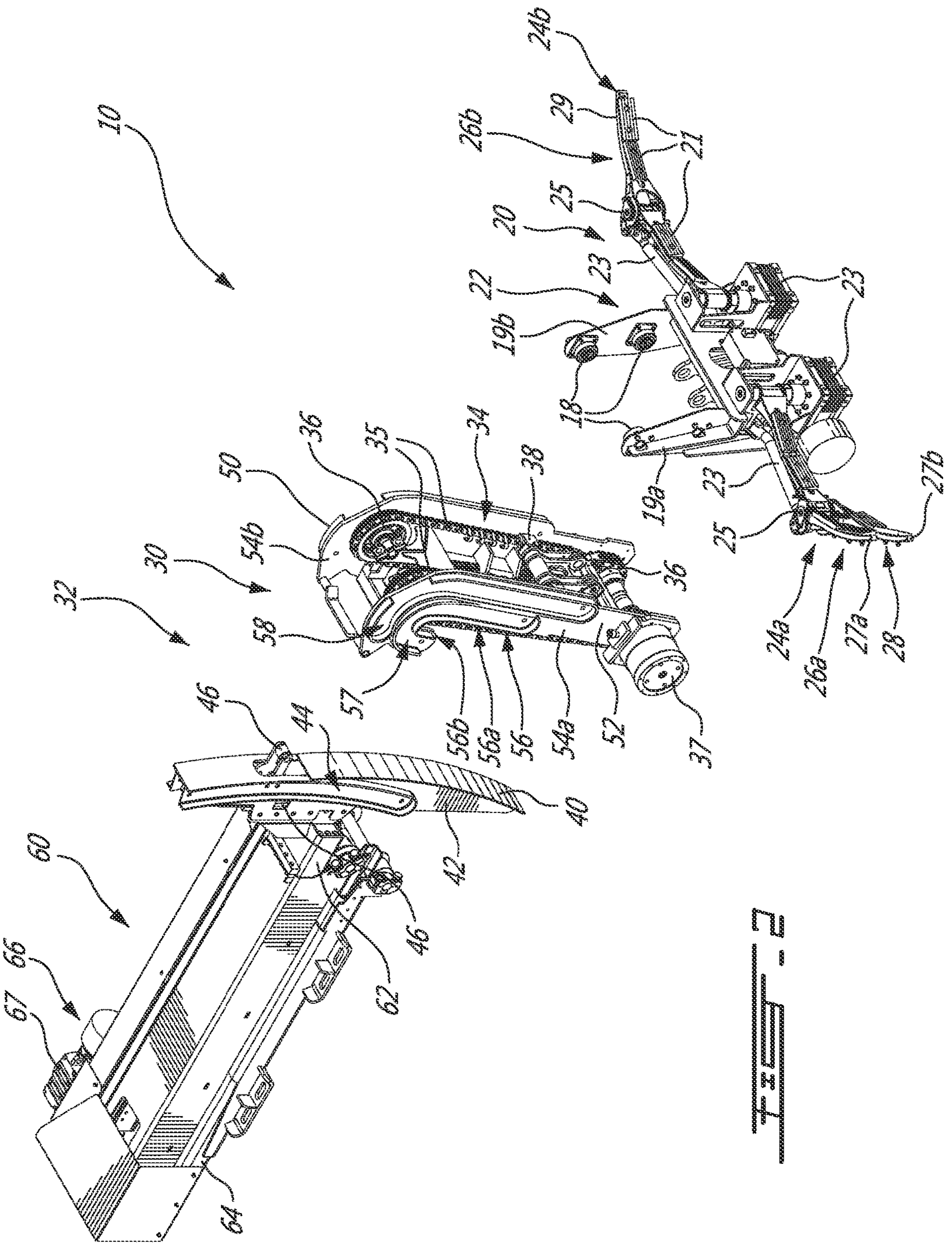
FIG. 2 is an exploded view of the mechanical arm of FIG. 1, shown without the corresponding garbage collection truck.

Referring to FIG. 2, in one embodiment, the mechanical arm 10 includes a grabber assembly 20 (alternately referred to herein as a garbage container holder) operative to engage and temporarily grasp successive corresponding garbage bins 12 during the garbage collection process. The grabber assembly 20 is a carriage operating as a prehension end-effector. The grabber assembly 20 is designed to grasp a garbage bin 12, hold the garbage bin 12 as it is moved into the dumping position and brought back to its initial position, and then release the garbage bin 12 (i.e. operate generally as shown from FIGS. 3A to 3F and then back to 3A).

In the embodiment shown, the grabber assembly 20 is of the finger gripper type and includes a main body 22 with two opposed fingers 24*a*, 24*b* pivotally mounted to the main body 22 and extending therefrom. The fingers 24*a*, 24*b* each include a rotative finger joint 25, thereby allowing the grabber assembly 20 to wrap around the garbage bin 12, in order to securely grasp the garbage bin 12 and adapt to several garbage bin sizes and shapes. The grabber assembly 20 is configurable between an open configuration where the fingers 24*a*, 24*b* extend opposed to one another and define a bin receiving space 26 in which a garbage bin 12 can be positioned to be subsequently grasped (see FIG. 3A) and a closed configuration where the fingers 24*a*, 24*b* are brought towards one another to engage the garbage bin 12 and hold it in a secure grip (see FIG. 3C). In the embodiment shown, in the closed configuration, the fingers 24*a*, 24*b* are wrapped over the garbage bin 12, but one skilled in the art will understand that, in an alternative embodiment (not shown) the fingers 24*a*, 24*b* could simply engage the sides of the garbage bin and press thereagainst to ensure a secure grip.

Figure 3A:
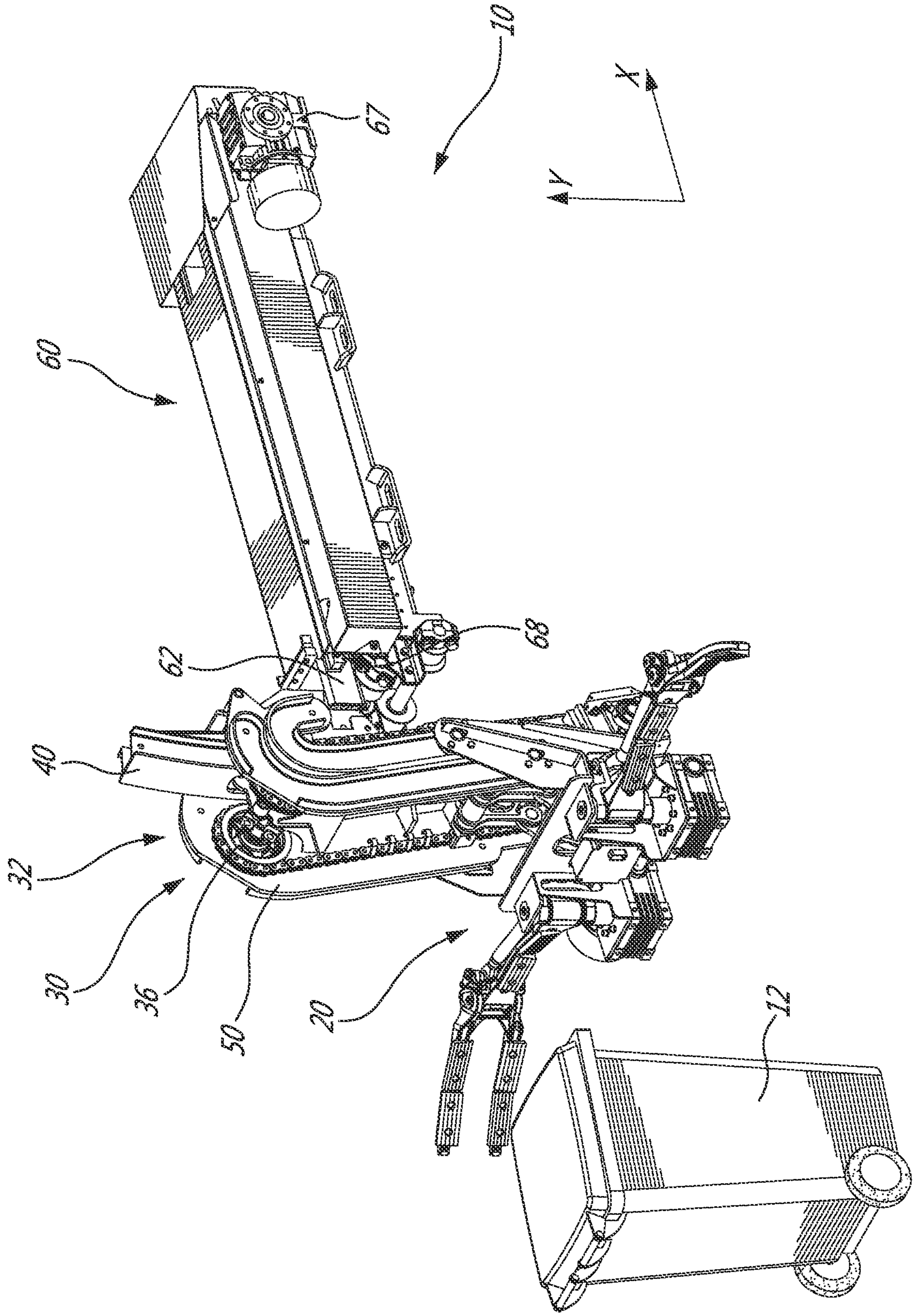
FIGS. 3A to 3G are perspective views of the mechanical arm, without the corresponding garbage collection truck, each one of the views showing the mechanical arm in a stage of a sequence of operation of the mechanical arm for collecting garbage.
Figure 3B:
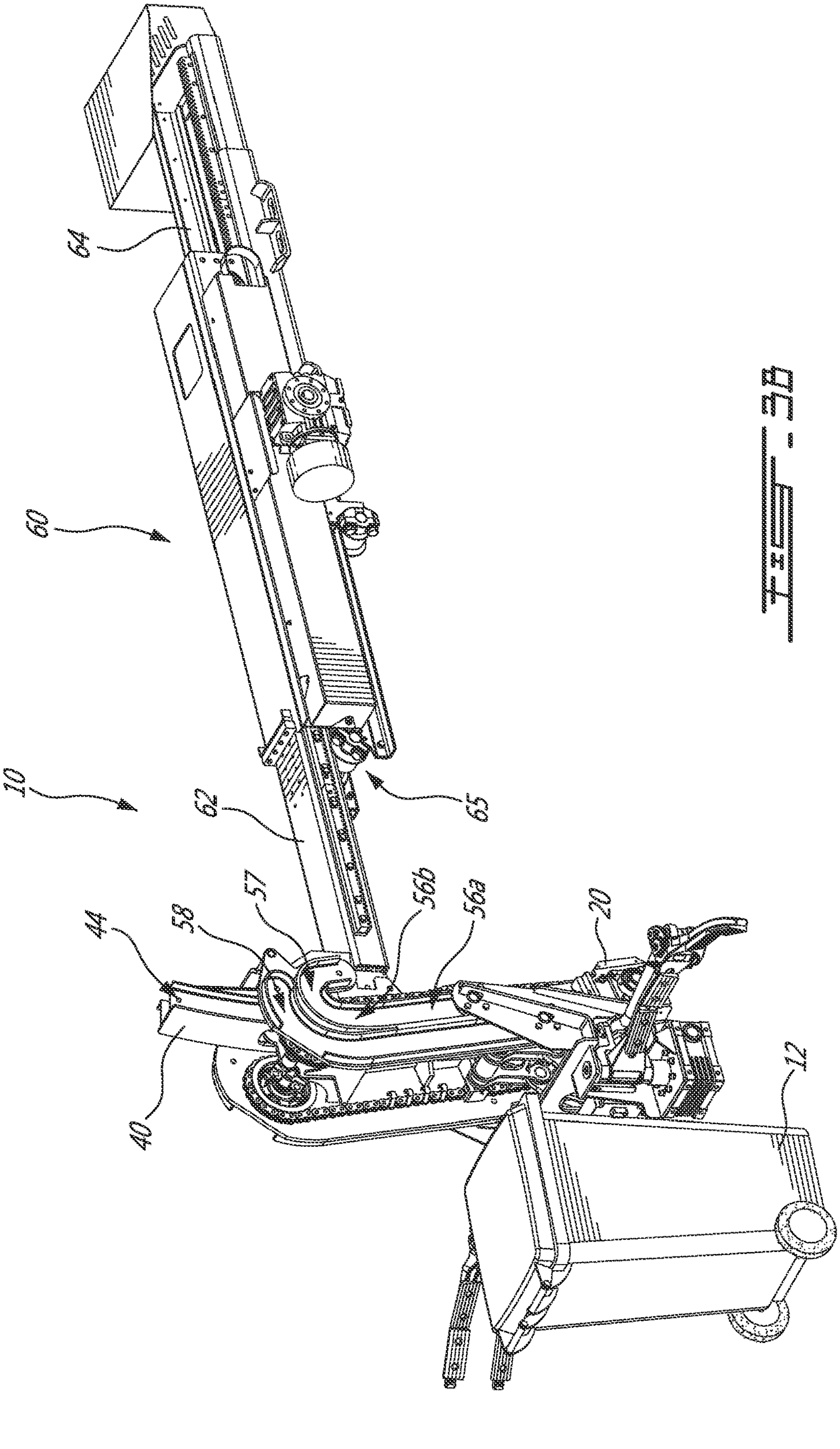
Figure 3C:
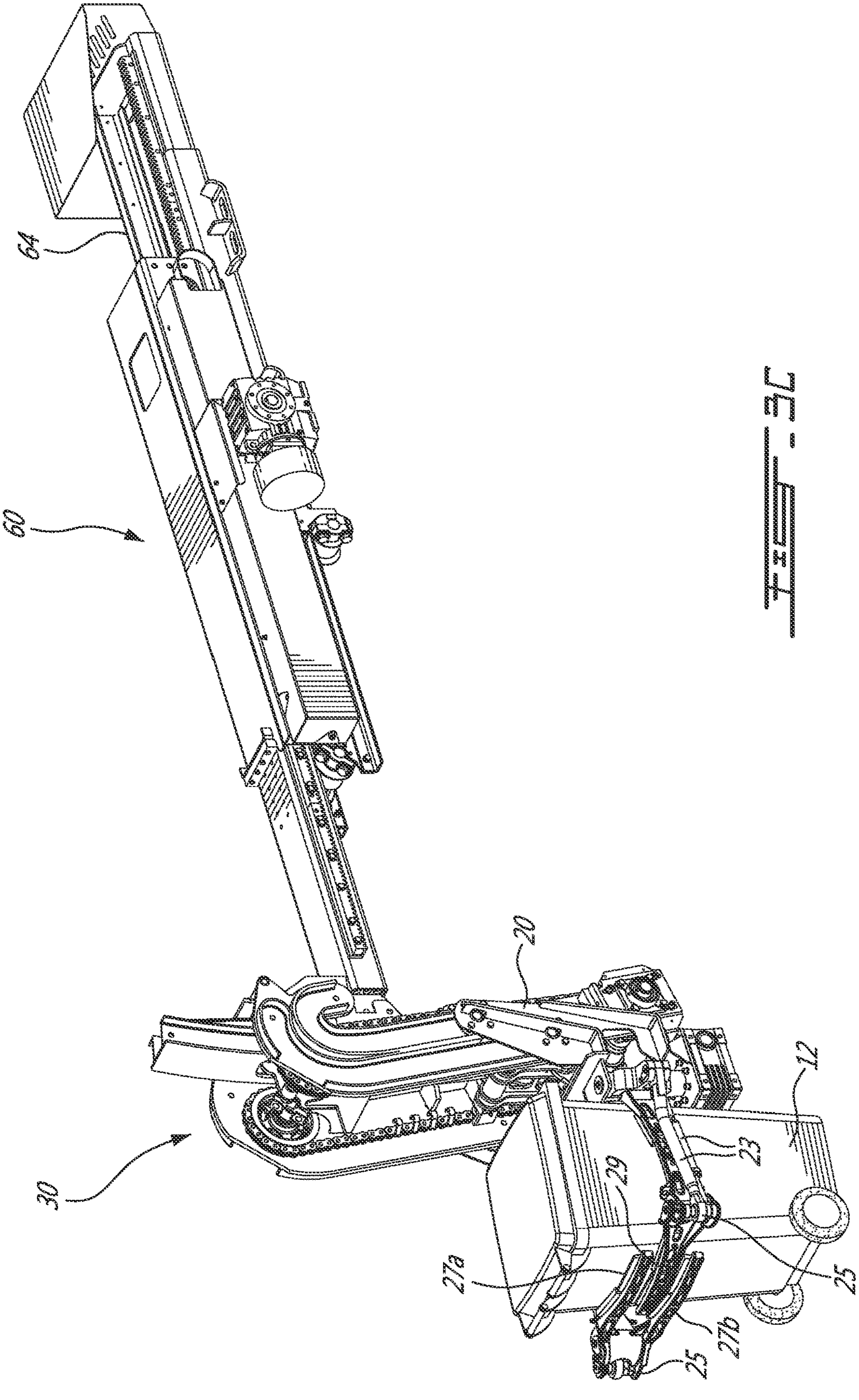
Figure 3D:
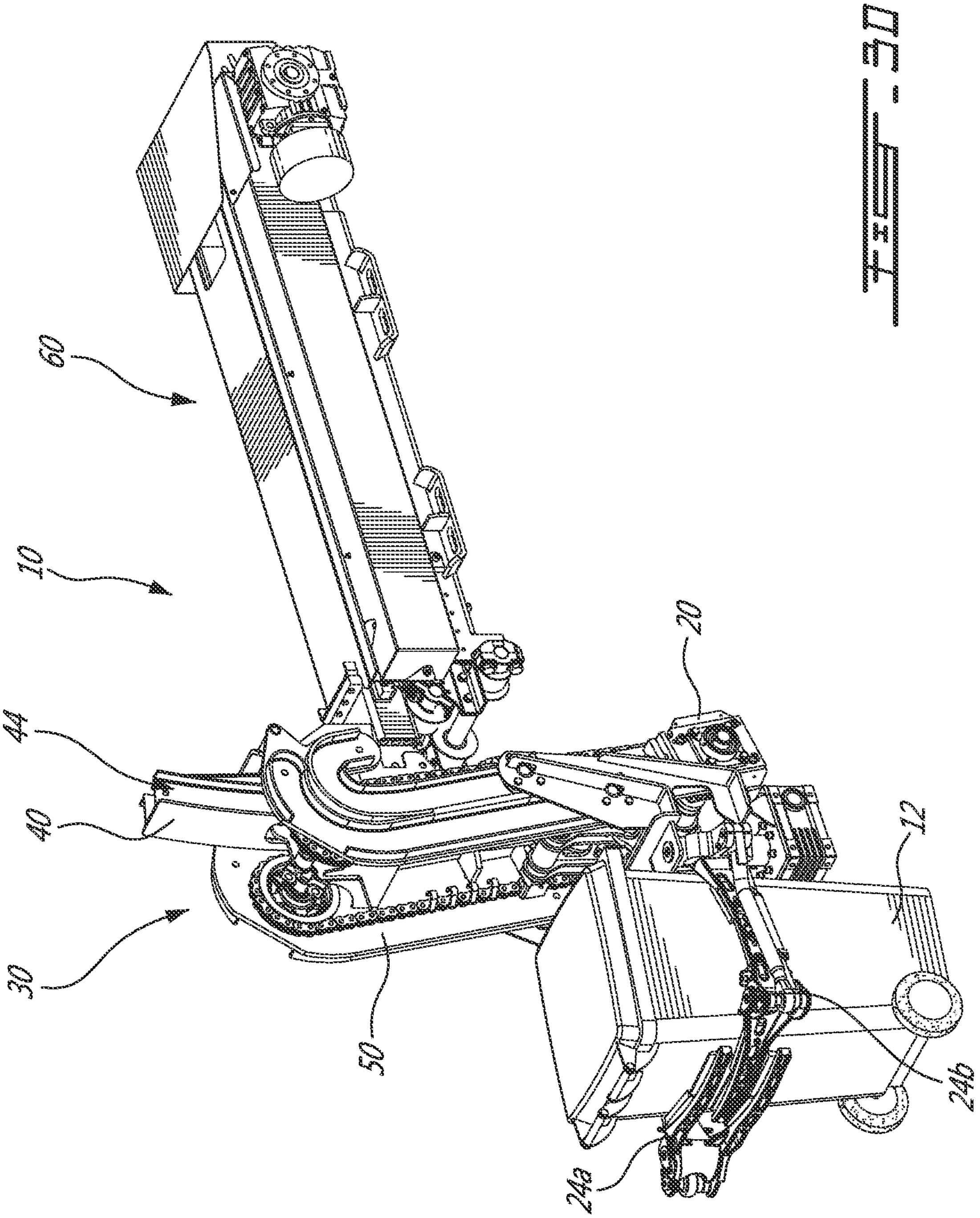

In this embodiment, the grabber assembly 20 also includes grabber actuators 23 connected between the main body 22 and the sections of the fingers 24*a*, 24*b* and operative to move the fingers 24*a*, 24*b* between the open configuration (see FIG. 3A) and the closed configuration (see FIG. 3B). In the embodiment shown, the grabber actuators 23 include a combination of rotary actuators and linear actuators, such as pneumatic cylinders, hydraulic cylinders, electro-mechanical actuators, or the like. One skilled in the art will understand that, in alternative embodiments, actuators different from the combination of rotary and linear actuators could also be used. In view of the above, one skilled in the art will understand that the grabber actuators 23 can be embodied using either one of electrical actuators or hydraulic actuators. Moreover, in an embodiment where hydraulic actuators are initially used for the grabber actuators 23, the actuators can subsequently be replaced to switch to electric actuators and vice-versa.

In the embodiment shown, end sections 26*a*, 26*b* of the fingers 24*a*, 24*b* have a different configuration between the first finger 24*a* and the second finger 24*b*. The first finger 24*a* has two members 27*a*, 27*b* spaced apart from one another and defining an opening 28 therebetween. The second finger 24*b* has a single member 29 positioned to extend in the opening between the two members 27*a*, 27*b* of the first finger 24*a* when the fingers 24*a*, 24*b* are configured in the closed configuration. In the embodiment shown, the two members 27*a*, 27*b* of the end section 26*a* of the first finger 24*a* are also of a longer length than the single member 29 of the end section 26*b* of the second finger 24*b*. In the embodiment shown, the fingers 24*a*, 24*b* have an inner surface, with the inner surface being lined with resilient anti-slip material, such as rubber pads 21 or the like.

One skilled in the art will understand that, in an alternative embodiment (not shown), the grabber assembly 20 could present a different configuration and/or a different operating mechanism than the grabber assembly 20 of the embodiment shown, while still allowing the required grasp, temporary hold and subsequent release of the garbage bin 12.

The mechanical arm 10 also includes a vertical displacement section 30. The grabber assembly 20 is operatively mounted to the vertical displacement section 30 and cooperates therewith to move the grabber assembly 20 along a vertical axis Y and selectively tilt (or tumble) the grabber assembly 20 with regard to the vertical axis Y. The tilting of the grabber assembly 20 with regard to the vertical axis Y allows the dumping of the content of the garbage bin 12 grasped and temporarily maintained by the grabber assembly 20, into the collection container 16 of the garbage truck 14 (or a section thereof).

The vertical displacement section 30 includes a multi-stage mast 32 extending substantially along the vertical axis Y. In the embodiment shown, the multi-stage mast 32 is a two stage (or duplex) mast 32 having a first mast section 40 (also referred to herein as primary mast) and a second mast section 50 (also referred to herein as terminal mast section or secondary mast). The second mast section 50 is slidably mounted to the first mast section 40 and is linearly and slidably movable thereabout. The main body 22 of the grabber assembly 20 is slidably mounted to the second mast section 50 and is slidably movable therealong to perform a portion of the vertical displacement and the tilting of the grabber assembly 20.

One skilled in the art will understand that, in an embodiment, the vertical axis Y can be perfectly vertical. In an alternative embodiment, the vertical axis Y can be angled with respect to a perfectly vertical axis. Therefore, the multi-stage mast 30 of the vertical displacement section 30 could extend perfectly vertical or substantially vertical (i.e. generally vertically, without having a perfectly vertical orientation), in a context of a truck standing on a perfectly horizontal surface. The orientation can then change when the truck is positioned on sloping ground, for instance.

As best seen in FIG. 2, the first mast section 40 includes an elongated body 42 extending substantially along the vertical axis Y, with a guiding track 44 (or first mast section guiding tracks) defined therein. In the embodiment, the guiding track 44 consists of two guiding tracks 44 positioned on opposite lateral faces of the body 42, which extend generally vertically along the vertical axis Y. In the embodiment shown, the guiding tracks 44 of the first mast section 40 have a slightly concave curvilinear profile. In other words, in the embodiment shown, the guiding tracks 44 of the first mast section 40 define a slight curve toward the exterior of the vehicle, generally arcuate in shape. One skilled in the art will understand that, in an alternative embodiment (not shown), the guiding tracks 44 of the first mast section 40 could have a substantially rectilinear profile, rather than the concave curvilinear profile as shown.

The second mast section 50 also includes an elongated body 52 extending substantially along the vertical axis Y. The elongated body 52 of the second mast section 50 includes opposed lateral walls 54*a*, 54*b* spaced apart from one another and configured to receive the body 42 of the first section 40 of the mast 32 therebetween. Hence, the vertical side walls 54*a*, 54*b* of the elongated body 52 of the second mast section 50 extend on opposed sides of the first mast section 40. The second mast section 50 also includes wheels (not shown) rotatably mounted to an inner surface of the vertical side walls 54*a*, 54*b*, each wheel being engaged in a corresponding guiding track 44 of the first mast section 40. The wheels can roll within the guiding tracks 44 to allow the second mast section 50 to slide smoothly, with limited friction, vertically with regard to the first mast section 40. In an embodiment where the secondary mast is symmetrical along a medial plane (vertical and forward-rearward oriented), the adjacent tracks on a first side of the secondary mast can be referred to as the first set of tracks, and the adjacent tracks on a second side of the secondary mast can be referred to as the second set of tracks, whereas the wheels on a first side of the garbage container holder can be referred to as a first set of wheels engaged with the first set of tracks, and the wheels on a second side of the garbage container holder can be referred to as a second set of wheels engaged with the second set of tracks.

Figure 3E:
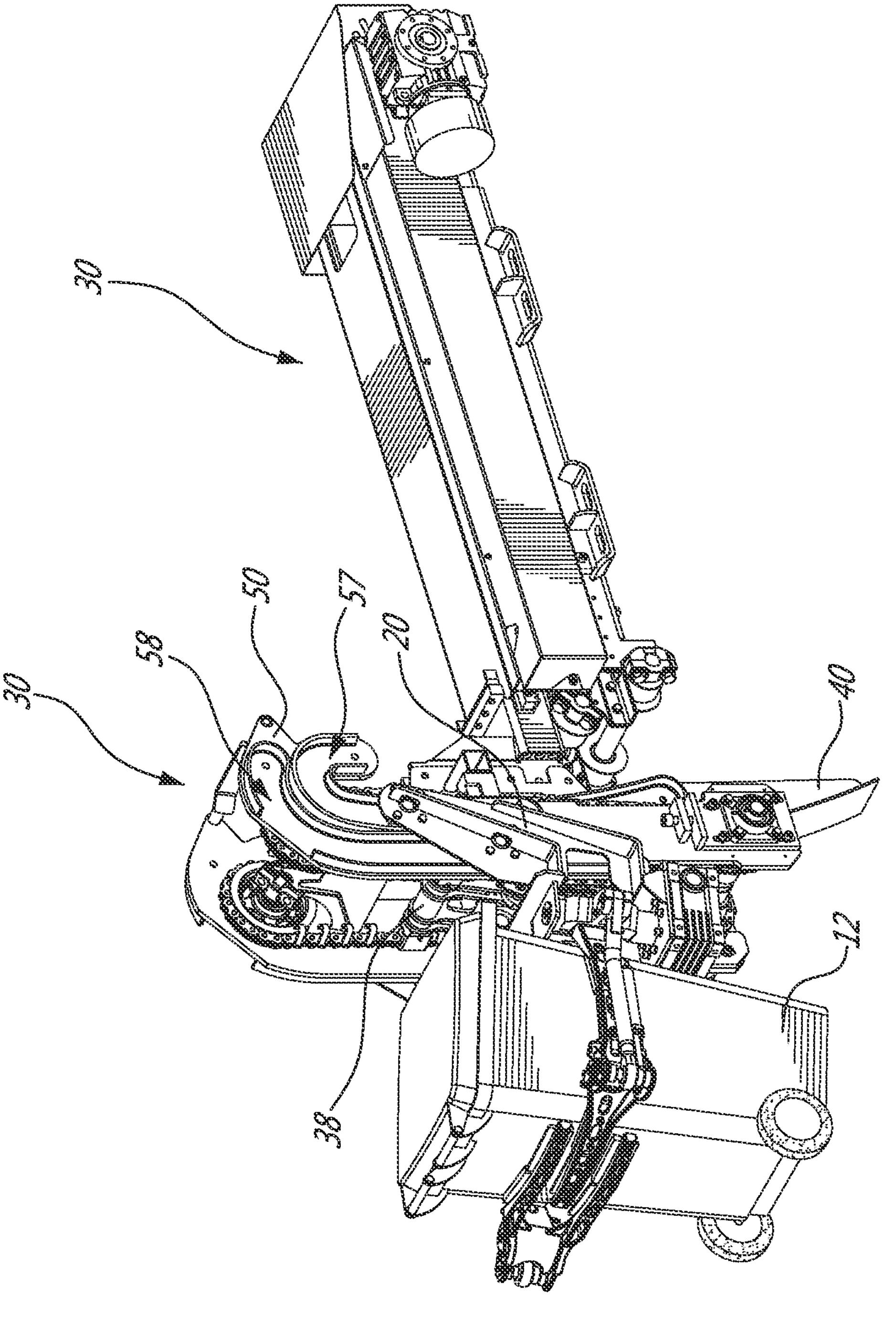

In the embodiment shown, the concave curvilinear profile of the guiding tracks 44 of the first mast section 40, results in the second mast section 50 being lightly tilted rearwardly, as the second mast section 50 is moved upwardly with regard to the first mast section 40, as shown in FIG. 3E. One skilled in the art will understand that, in an alternative embodiment (not shown), where the guiding tracks 44 of the first mast section 40 would have a substantially straight profile, the second mast section 50 could remain in the same orientation as it is moved up and down along the first mast section 40.

The second mast section 50 includes two generally parallel guiding tracks 56 which will be referred to as an inner track 57 and an outer track 58. In this embodiment, both the inner track 57 and the outer track 58 include two laterally opposite track segments, one on each lateral side of the second mast section. In this embodiment, both guiding tracks 57, 58 are roughly parallel, and can be said to have a lower portion and an upper portion. The lower portion 56*a* is straight and extends substantially linearly along the vertical axis Y. The upper portion 56*b* is curved. The lower portion 56*a* and the upper portion 56*b* are consecutive and extend continuously, forming a continuous wheel path. The upper portion 56 is positioned at an upper end of the corresponding one of the opposed vertical side walls 54*a*, 54*b* and has a pronounced curved profile, with the curve leading inwardly, i.e. in a direction towards a rear of the arm 10.

In an embodiment, being adjacent one another, the degree of curvature of the curved upper portion 56*b* of the inner track 57 is greater than the degree of curvature of the corresponding outer track 58. In other words, the radius of the upper portion 56*b* of the inner track 57 is smaller than the curve radius of the upper portion of the outer track 58. The grabber assembly 20 has two sets of wheels, an upper set engaged with the inner track 57, and a lower set engaged with the outer track 58. When the wheels of the grabber assembly 20 are slid along the corresponding tracks 57, 58, eventually along the curved upper portions thereof and to a limit of the wheel path, the upper wheels are pivoted around the smaller radius of the inner track 57, whereas the lower wheels are pivoted around the greater radius of the outer track 58, which leads to a significant (but relatively smooth) change in orientation of the grabber assembly 20, to the extent where its load is tilted rearwardly and upside-down, directing the contents of the bin into the truck's chamber.

In view of the above, in an embodiment, the curve radius of the curved upper portion 56*b* of the inner track segment 57 is configured to provide a smooth and relatively continuous pivoting path offering limited jerk of the grabber assembly 20 during tilting. The curve radius of the curved upper portion 56*b* of the inner track segment 57 can also, as shown, be configured to avoid interference between the grabber assembly 20 and the second mast section 50. It will be understood that a curve radius of the upper portion 56*b* of the inner track 57 that is too great could result in the grabber assembly 20 tilting too early and colliding with the second mast section 50, thereby preventing proper operation of the arm 10. In other words, the combination of the position of the upper portion 56*b* of the inner track 57 with regard to the substantially straight lower portion 56*a* of the corresponding guiding track 56 and the curve radius of the upper portion 56*b* of the inner track 57, is such that no interference occurs between the grabber assembly 20 and the second mast section 50, as the grabber assembly 20 tilts.

In the embodiment shown, the curve radius of the outer track 58 is set in accordance with the position of pinions 36 of a vertical actuation mechanism 34 (which will be described in more details below), such that when the grabber assembly 20 is driven in the curved upper portion 56*b* of the guiding tracks 56, a linkage 38 connecting the grabber assembly 20 to heavy-duty roller chains 35 engaged with the pinions 36 of the vertical actuation mechanism 34 remains substantially in line with a tangent of the section of the chains 35 engaged with the corresponding pinions 36, thereby also contributing to minimizing acceleration of the grabber assembly 20 during tilting.

The main body 22 of the grabber assembly 20 also includes vertical side walls 19*a*, 19*b* spaced apart from one another and configured to receive the body 52 of the second mast section 50 therebetween. The vertical side walls 19*a*, 19*b* of the main body 22 of the grabber assembly 20 extend on opposed sides of the second mast section 50. The grabber assembly 20 also includes wheels 18 rotatably mounted to an inner surface of the vertical side walls 19*a* 19*b*, and engageable in the corresponding guiding track 57, 58 of the second mast section 50 to allow the grabber assembly 20 to move vertically with regard to the second mast section 50. In the embodiment shown, two wheels 18 are rotatably mounted to the inner surface of each one of the vertical side walls 19*a* 19*b*, one of these two wheels being engageable in a respective one of the inner track 57 and the outer track 58.

In view of the above, the grabber assembly 20 initially holds the bin 12 in a natural upright orientation and moves it upwardly along the second mast section 50 (with the wheels 18 rolling in the lower portions of the corresponding tracks and subsequently tilts the bin rearwardly when it reaches the upper end of the second mast section 50, i.e. when the wheels 18 travel into the curved upper portion 56*b* of the corresponding guiding track 56 of the second mast section 50.

In the embodiment shown, the wheels 18 engaged in the inner track 57 are positioned upwardly from the wheels 18 engaged in the outer track 58 on the vertical side walls 19*a* 19*b* of the grabber assembly 20. When combined with the inner track 57 having a greater degree of curvature in the upper portion 56*b* than the corresponding portion of the outer track 58, such a positioning of the wheels 18 result in a smoother tilting of the grabber assembly 20 (and the garbage bin 12 maintained thereon). Indeed, in the embodiment shown, when the grabber assembly is raised along the tracks 57, 58, the wheels 18 engaged in the inner track 57 reach the curved upper portion of the inner track 57 and begin to pivot before the wheels 18 engaged in the outer track 58 has reached the corresponding curved upper portion. This smooth, continuous motion can lead to a smooth tilting of the grabber assembly 20 and efficient dumping of the content of the garbage bin 12 grasped by the grabber assembly 20, while minimizing potential mechanical fatigue failure of the components.

The vertical displacement section 30 also includes a vertical actuation mechanism 34 operative to vertically displace the second mast section 50 and the grabber assembly 20. In other words, the vertical actuation mechanism 34 is operative to drive the mast sections of the multi-stage mast 32 to slide onto one another and to drive the grabber assembly 20 to slide on the second mast section 50 (or terminal mast section).

In the embodiment shown, the actuation mechanism 34 includes heavy-duty roller chains 35 having a portion securable to the first mast section 40 and extending between the above-referenced pinions 36 rotatably mounted to the body 52 of the second mast section 50. The heavy-duty roller chains 35 are actuable by a rotary actuator 37 selectively driving at least one of the pinions 36 in rotation. In the embodiment shown, the rotary actuator 37 is connected to a pinion 36 positioned at the lower end of the body 52 of the second mast section 50, but one skilled in the art will understand that, in alternative embodiments (not shown), the rotary actuator 37 could be connected to any of the pinions 36. The grabber assembly 20 is also securable to a portion of the heavy-duty roller chains 35, through the above referenced linkage 38 securely connecting the grabber assembly 20 to the heavy-duty roller chains 35, in order to move therewith.

One skilled in the art will understand that the rotary actuator 37 can be embodied using either one of an electrical actuator or an hydraulic actuator. Moreover, in an embodiment where an hydraulic actuator is initially used for the rotary actuator 37, the actuator can subsequently be replaced to switch to an electric actuator and vice-versa. In this embodiment, electric actuators were preferred.

In the embodiment shown, the vertical actuation mechanism 34 includes two heavy-duty roller chains 35, but one skilled in the art will understand that, in an alternative embodiment (not shown), a single roller chain or more than two roller chains could be used. In an embodiment, the first mast section 40 includes projections 46 each securable to the portion of the corresponding heavy-duty roller chains 35, for example by engaging one of the links of the corresponding roller chain 35 therewith.

In operation, given that a portion of the heavy-duty roller chains 35 is secured to the first mast section 40, the actuation of one of the pinions 36 by the rotary actuator 37 results in the second mast section 50 being moved upwardly/downwardly with respect to the first mast section 40 (i.e. the second mast section sliding upwardly/downwardly with respect to the first mast section 40). In view of the above, the upward/downward movement of the second mast section 50 with respect to the first mast section 40, drives the wheels (not shown) of the second mast section 50 along the guiding tracks 44 of the first mast section 40.

Given that the grabber assembly 20 is also secured to a portion of the heavy-duty roller chains 35, the actuation of one of the pinions 36 by the rotary actuator 37 simultaneously results in the grabber assembly 20 being moved upwardly/downwardly with respect to the second mast section 50 (i.e. the grabber assembly 20 sliding upwardly/downwardly on the second mast section 50). As mentioned above, the upward movement of the grabber assembly 20 with respect to the second mast section 50, drives the wheels 18 of the grabber assembly 20 along the guiding tracks 56 of the second mast section 50 and moves the grabber assembly 20 substantially straight as the wheels 18 are engaged in the substantially straight lower portion 56*a* of the corresponding guiding track 56 and in a rearward tilting movement as the wheels 18 travel into the curved upper portion 56*b* of the corresponding guiding track 56. The reverse movements are performed during the downward movement of the grabber assembly 20 with respect to the second mast section 50.

In an embodiment, the vertical actuation mechanism 34 also includes a chain tensioning mechanism (not shown) operative to adjust the tension of the roller chains 35. For example and without being limitative, in an embodiment, the chain tensioning mechanism (not shown) can include at least one linear actuator, such as a pneumatic cylinder, an hydraulic cylinder, an electro-mechanical actuator, or the like, operatively connected to a corresponding one of the pinions 36 to move the pinion 36 and consequently adjust the tension of the corresponding roller chain 35. In an embodiment, the chain tensioning mechanism (not shown) is operatively connected to the pinion 36 actuated by the rotary actuator 37.

One skilled in the art will understand that, in alternative embodiments, a vertical actuation mechanism different from the vertical actuation mechanism 34 of the embodiment shown could also be used to vertically displace the second mast section 50 and the grabber assembly 20 (i.e. move the second mast section 50 and the grabber assembly 20 in up/down movements). For example and without being limitative, linear actuators such as pneumatic cylinders, hydraulic cylinders, electro-mechanical actuators, or the like, or a combination of linear actuators and roller chains with corresponding pinions could be used to operatively connect the first mast section 40 and the second mast section 50 and the second mast section 50 and the grabber assembly 20. In view of the above, one skilled in the art will understand that the either one of electrical actuators or hydraulic actuators could be used and that, in an embodiment where hydraulic actuators are initially used for, the actuators can subsequently be replaced to switch to electric actuators and vice-versa. Other driving mechanism could also be used.

In an embodiment, the second mast section 50 includes a support hook (not shown) extending therefrom, at the upper end thereof, and the grabber assembly 20 includes a projection (not shown) engageable with the support hook (not shown) of the second mast section 50, when the grabber assembly 20 reaches the upper end of the guiding tracks 56 of the second mast section 50. The combination of the hook (not shown) of the second mast section 50 and the projection (not shown) of the grabber assembly 20, allows reduction of the strain on the chains 35, when the grabber assembly 20 has reached the upper most position and tilts to dump the garbage, a portion of the weight of the grabber assembly 20 and the garbage bin 12 being supported by the hook (not shown) engaged in the projection (not shown). In other words, the combination of the hook (not shown) of the second mast section 50 and the projection (not shown) of the grabber assembly 20 supports a portion of the weight of the grabber assembly 20 and the garbage bin 12, during the dumping of the garbage from the garbage bin 12, when the hook (not shown) is engaged in the corresponding projection (not shown). One skilled in the art will understand that, in an alternative embodiment, the hook and projection could be inverted, i.e. the support hook (not shown) could extend from the main body 22 of the grabber assembly 20, with the projection projecting from the body 52 of the second mast section 50. One skilled in the art will understand that, in an alternative embodiment, the mechanical arm 10 could be free of the above described hook and projection assembly.

One skilled in the art will also understand that, in an alternative embodiment (not shown), the vertical displacement section 30 could be different from the vertical displacement section 30 of the embodiment shown. For example and without being limitative, the multi-stage mast 32 could include more than two stages (i.e. the vertical displacement section 30 could include a triple stage mast, a quadruple stage mast, etc.), with the last mast section (i.e. the mast section moving the highest when the mast 32 is completely deployed) being the terminal mast section.

In an embodiment, the mechanical arm 10 further includes a horizontal displacement section 60 extending substantially along an horizontal axis X and being operatively connected to the grabber assembly 20 to selectively move the grabber assembly 20 substantially horizontally. In other words, the horizontal displacement section 60 is operative to move the vertical displacement section 30 of the mechanical arm 10, substantially along a horizontal axis X, thereby producing in and out movements of the grabber assembly 20 with regards to the garbage collection truck 14 and allowing the garbage bins 12 located within a horizontal range of the garbage collection truck 14 to be engaged by the grabber assembly 20.

In the embodiment shown, the horizontal displacement section 60 includes a connecting shaft 62 with the first mast section 40 (i.e. the multi-stage mast 32) of the vertical displacement section 30 secured thereto, at a distal end thereof. The connecting shaft 62 is horizontally movable along the horizontal axis X, to move the vertical displacement section 30 (and the grabber assembly 20 positioned at the front end thereof) horizontally in in/out movements with regard to the garbage collection truck 14. The connecting shaft 62 is slidably mounted to a longitudinal horizontal rail 64 and is longitudinally displaceable thereabout. The horizontal rail 64 is secured to the garbage collection truck 14 and includes a sliding mechanism 65 with sliding components such as tracks and free rolling rollers to minimize friction between the horizontal rail 64 and the longitudinally displaceable connecting shaft 62.

One skilled in the art will understand that, in an embodiment, the horizontal axis X can be perfectly horizontal. In an alternative embodiment, the horizontal axis X can be angled upwardly or downwardly with respect to a perfectly horizontal axis. Therefore, the horizontal displacement section 60 could perform perfectly horizontal movement, or substantially horizontal movement, which vary from a perfectly horizontal orientation, while remaining generally horizontal.

In an embodiment, the horizontal displacement section 60 further includes a horizontal actuation mechanism 66 operatively connected between the connecting shaft 62 and the horizontal rail 64, to move the connecting shaft 62 about the horizontal rail 64. In the embodiment shown, the actuation mechanism 66 includes a rotary actuator 67 driving a pinion (not shown) of a rack and pinion assembly 68. One skilled in the art will understand that, in an alternative embodiment (not shown), the horizontal actuation mechanism 66 could be different from the embodiment shown. For example and without being limitative, in an embodiment (not shown), the horizontal actuation mechanism 66 could include a linear actuator. Once again, one skilled in the art will understand that the rotary actuator 67 or alternative linear actuator can be embodied using either one of an electrical actuator or an hydraulic actuator and that, in an embodiment where an hydraulic actuator is initially used, the actuator can subsequently be replaced to switch to an electric actuator and vice-versa.

One skilled in the art will understand that, in an alternative embodiment (not shown), the horizontal displacement section 60 could be different from the horizontal displacement section 60 of the embodiment shown while still allowing the vertical displacement section 30 of the mechanical arm 10 to be moved substantially along the horizontal axis X and produce the desired in/out movements of the grabber assembly 20 with regards to the garbage collection truck 14.

In an embodiment, the mechanical arm 10 can include a weight sensor (not shown), such as, without being limitative, a strain gage weight sensor. In an embodiment, the weight sensor (not shown) is mounted between the second mast section 50 and the grabber assembly 20, thereby allowing the measure of the weight of individual garbage bins 12, as they are being grasped by the mechanical arm 10. The minimal swing-out and constant movement (i.e. movement that has minimal jerk) provided by the mechanical arm 10 described herein, can help in acquiring accurate weight data for the weight of the individual garbage bins 12 using the weight sensor (not shown).

In an embodiment, the mechanical arm 10 includes an electronic control system (not shown) operatively connected to the actuators 23, 37, 67 of the grabber assembly 20 and/or the vertical displacement section 30 and/or the horizontal displacement section 60, such that the operations of the components thereof for grasping, moving and releasing the garbage bin 12 are synchronized. In an embodiment, the electronic control system (not shown) can move the components with a different velocity, depending of the position. For example and without being limitative, the velocity of the components of the vertical displacement section 30 can be greater when the second mast section 50 and the grabber assembly 20 are driven in a substantially straight direction than when the grabber assembly 20 is being tilted (i.e. when the wheels 16 of the grabber assembly 20 are moving into the curved portion 56*b* of the guiding tracks 56).

Referring to FIGS. 3A to 3F, the mechanical arm 10 therefore allows the automated collection of garbage located in garbage bins 12 left for collection by users. In order to perform garbage collection, the mechanical arm 10 is initially extended outwardly (i.e. moved outwardly from the garbage collection truck 14 in a substantially horizontal movement, between a retracted configuration and an outwardly extended configuration) (see FIGS. 3A and 3B, with the mechanical arm 10 shown in a retracted configuration in FIG. 3A and in an outwardly extended configuration in FIG. 3B). The mechanical arm 10 is extended outwardly through operation of the horizontal displacement section 60.

In the outwardly extended configuration, the grabber assembly 20 engages a collection bin 12. The grabber assembly 20, can subsequently be moved from the open configuration to the closed configuration, to grasp and hold the collection bin 12 (see FIGS. 3B and 3C, with the grabber assembly 20 shown in the open configuration in FIG. 3B and in the closed configuration in FIG. 3C) and the mechanical arm 10 can be retracted inwardly (i.e. moved inwardly towards the garbage collection truck 14 in a substantially horizontal movement, between the outwardly extended configuration and the retracted configuration) (see FIGS. 3C and 3D, with the mechanical arm 10 shown grasping the garbage bin 12 in the outwardly extended configuration in FIG. 3C and in the retracted configuration in FIG. 3D).

Figure 3F:
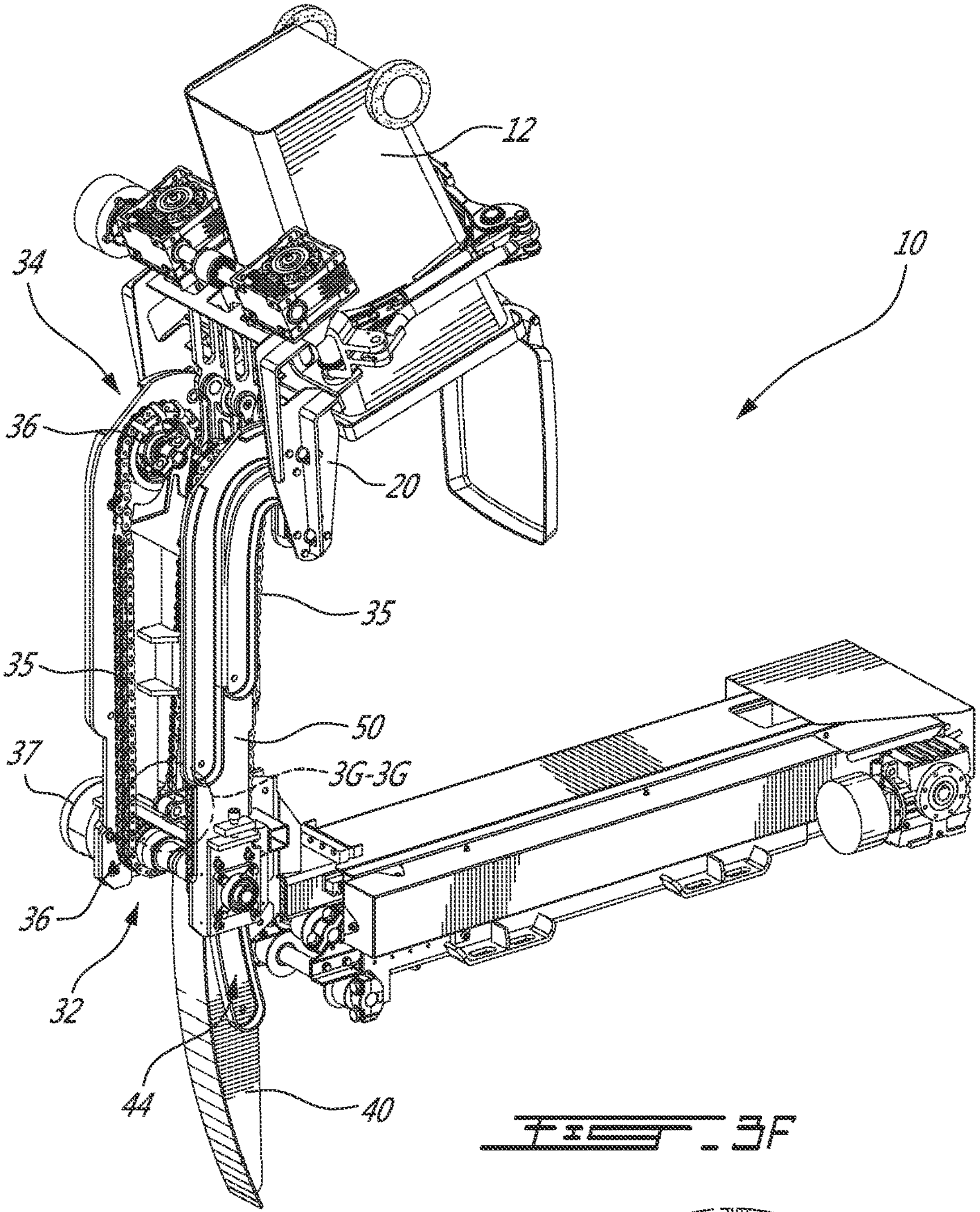
Figure 3G:
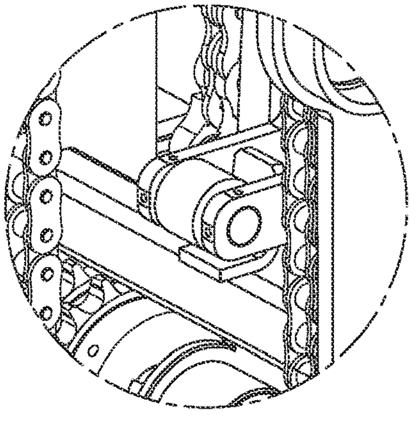
Figure 4:
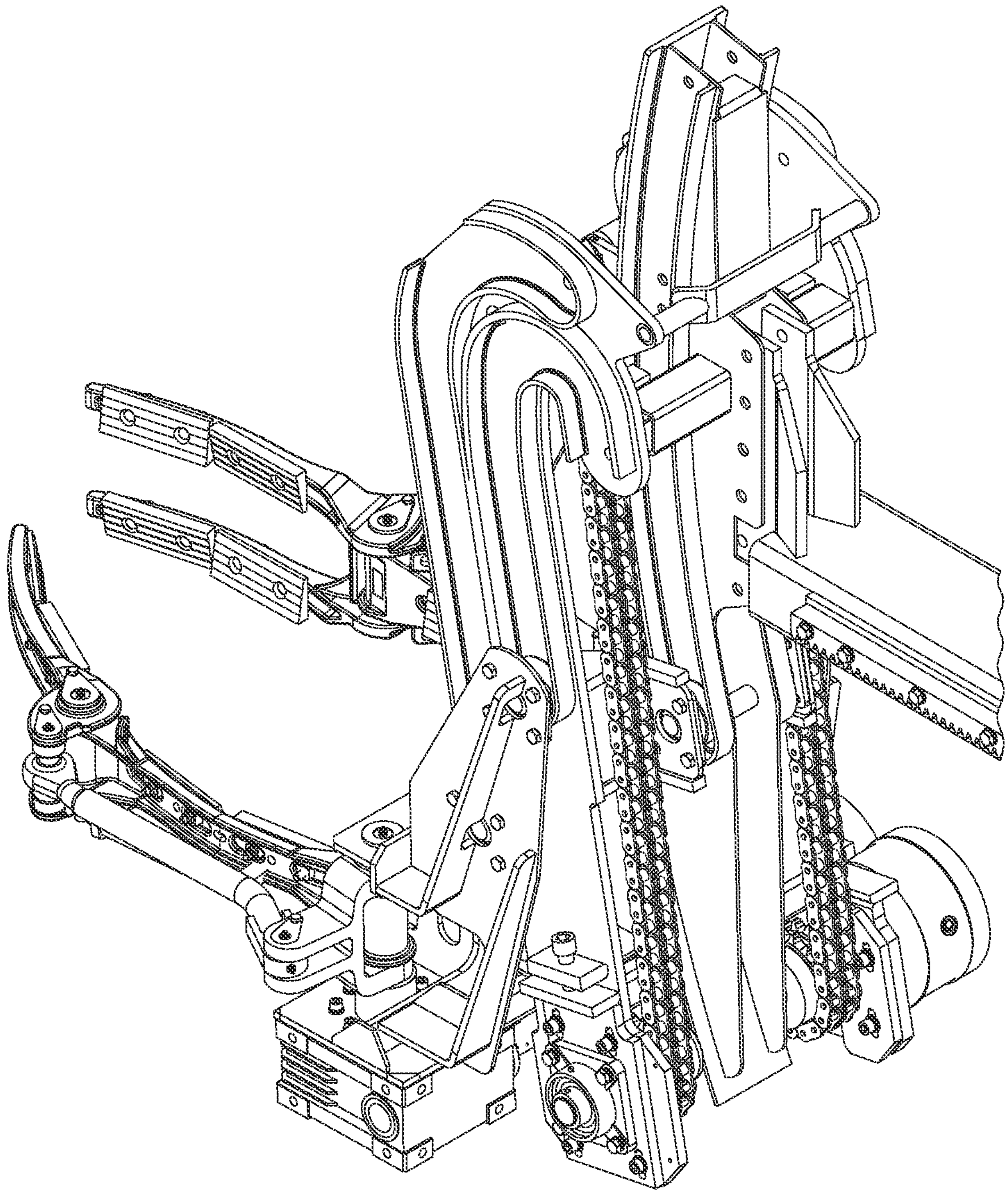
FIG. 4 is another oblique view of the mechanical arm taken from the rear.
Figure 5:
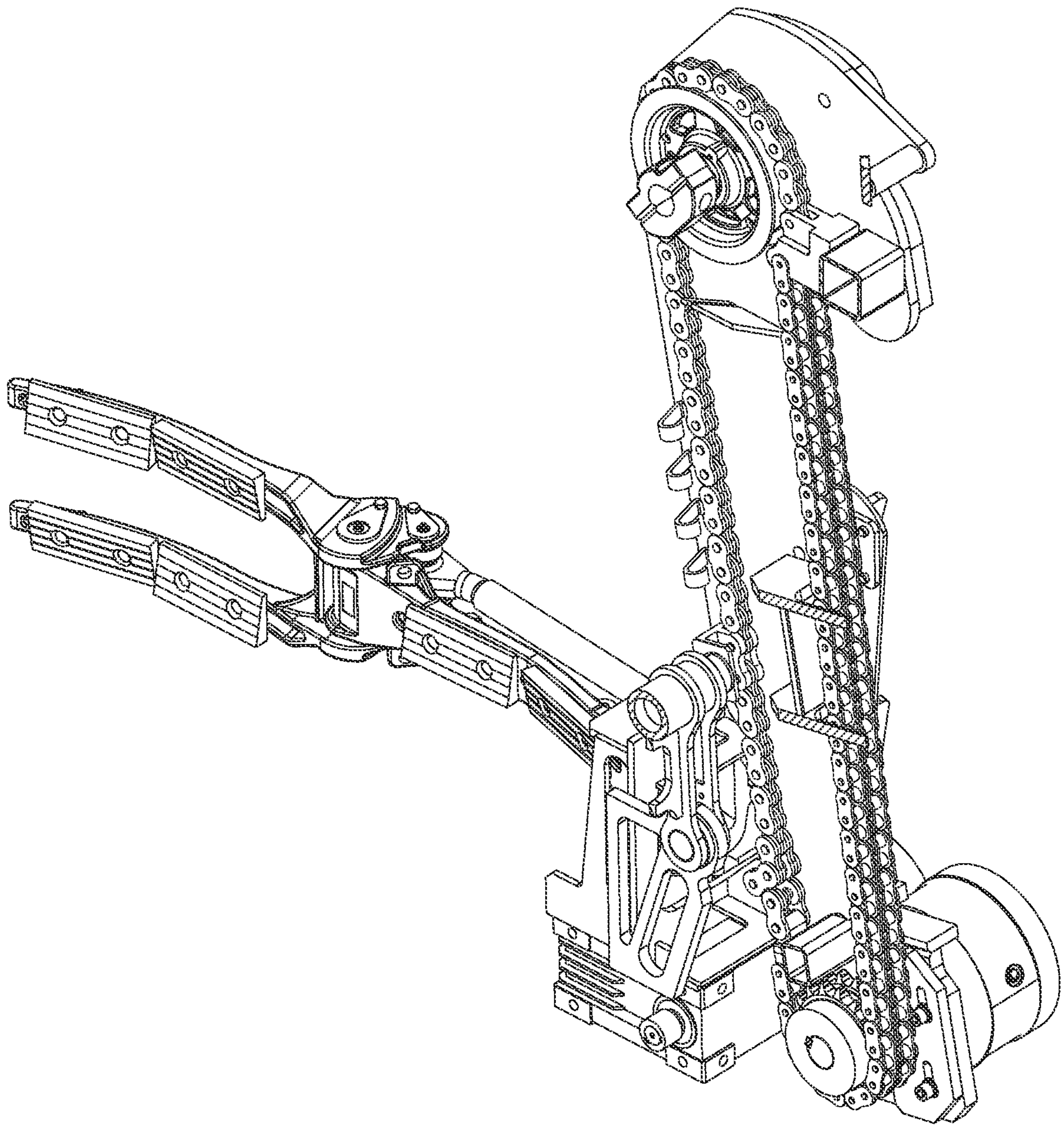
FIG. 5 is a cross-sectional oblique view taken along a vertical and forward-rearward oriented cross-section plane from FIG. 4.

Subsequently, the vertical displacement section 30 is used to move the second mast section 50 and the grabber assembly 20 upwardly, with the grabber assembly 20 securely holding the garbage bin 12 (see FIGS. 3E and 3F, wherein the vertical displacement section 30 is shown in an intermediary raised configuration in FIG. 3E and the vertical displacement section 30 is shown in a completely raised configuration in FIG. 3F. As can be seen in FIG. 3F, when the vertical displacement section 30 is brought to the completely raised configuration, the grabber assembly 20 is tilted to empty the content of the garbage bin 12 hold by the grabber assembly 20. The tilting of the grabber assembly 20 results from the above described grabber assembly 20 having wheels 18 engaged in the guiding tracks 56 of the second mast section 50 and thereby following the path of the guiding tracks 56 as the grabber assembly is slid onto the second mast section 50, with the track having a substantially straight lower portion 56*a* and a curved upper portion 56*b*. As mentioned above, the curved upper portion 56*b* of the guiding tracks 56 has a degree of curvature sufficient to cause the tilting (or tumbling) of the garbage bin 12 hold by the grabber assembly 20 and resulting in emptying of the content thereof.

The reverse operation sequence can subsequently be performed to move the second mast section 50 and the grabber assembly 20 downwardly (see FIGS. 3F and 3E), drive the grabber assembly 20 and the corresponding garbage bin 12 outwardly (see FIG. 3D), release the garbage bin 12 (see FIG. 3C) and bring back the mechanical arm 10 in the retracted configuration (See FIGS. 3B and 3A).

Even though the term "garbage" is used herein, it will be understood that the mechanical arm 10 can be used to perform collection of any type of material which can be placed in a bin 12 (or container) that can be manipulated by the mechanical arm 10, such as, without being limitative, municipal solid waste (or trash), recycling material, food waste (or organic waste), or the like As can be understood, the examples described above and illustrated are intended to be exemplary only. The scope is indicated by the appended claims.

What is claimed is:

1. A mechanical arm system for a refuse vehicle, the mechanical arm system comprising:

a mast comprising a track having a lower portion and an upper portion, the upper portion defining a profile that curves inwardly towards the refuse vehicle;

a grabber coupled with the mast and configured to grasp a refuse container, the grabber comprising a carriage supporting movable graspers;

a flexible driver attached to the carriage of the grabber and supported to move in a closed loop along the mast;

a first electrical actuator configured to drive the movable graspers between an open position and a closed position;

a second electrical actuator configured to apply force to the flexible driver to move the flexible driver and drive the carriage of the grabber along the track of the mast between an initial position and a dump position, such that:

with the carriage in the initial position on the lower portion of the track, the grabber holds the refuse container in an upright orientation; and with the carriage in the dump position on the upper portion of the track, the grabber holds the refuse container in a tilted orientation;

an extendable boom having a proximal end and a distal end, the proximal end securable to the refuse vehicle, and the distal end securable to at least a portion of the mast at a distal end; and a third electrical actuator configured to drive the extendable boom between a laterally retracted position and a laterally extended position.

2. The mechanical arm system of claim 1, wherein the third electrical actuator is configured to rotate a pinion of a rack-and-pinion assembly.

3. The mechanical arm system of claim 1, wherein the third electrical actuator comprises a linear actuator.

4. The mechanical arm system of claim 1, wherein the extendable boom comprises a rail attachable to the refuse vehicle and a connecting shaft attachable to the portion of the mast, and wherein the third electrical actuator is configured to move the connecting shaft along the rail.

5. The mechanical arm system of claim 4, further comprising a sliding mechanism including a track extending along the rail and rollers residing between the track and the connecting shaft.

6. The mechanical arm system of claim 1, further comprising a control system configured to control the first, second, and third electrical actuators to drive the movable graspers, the carriage of the grabber, and the extendable boom through predefined movements.

7. The mechanical arm system of claim 1, further comprising a weight sensor mounted between the mast and the grabber.

8. The mechanical arm system of claim 1, wherein the mast comprises a multi-stage mast comprising a primary mast and a secondary mast.

9. The mechanical arm system of claim 8, wherein the second electrical actuator is further configured to drive the secondary mast along the primary mast.

10. The mechanical arm system of claim 1, wherein the flexible driver comprises a chain, and wherein the second electrical actuator is configured to apply tension to the chain.

11. The mechanical arm system of claim 1, wherein the grabber further comprises one or more wheels engaged with the track of the mast.

12. A mechanical arm system for a refuse vehicle, the mechanical arm system comprising:

a mast comprising a track having a lower portion and an upper portion, the upper portion defining a profile that curves inwardly towards the refuse vehicle;

a grabber configured to grasp a refuse container, the grabber comprising a carriage supporting movable graspers;

a conveyor attached to the carriage of the grabber and supported to move in a closed loop along the mast;

a first electrical actuator configured to drive the movable graspers between an open position and a closed position; and a second electrical actuator configured to rotate a gear to move the conveyor, wherein the carriage of the grabber is coupled to the mast via the conveyor configured to engage a pinion such that rotation of the pinion drives the carriage of the grabber along the track of the mast between an initial position and a dump position, such that:

with the carriage in the initial position on the lower portion of the track, the grabber holds the refuse container in an upright orientation; and with the carriage in the dump position on the upper portion of the track, the grabber holds the refuse container in a tilted orientation, wherein the second electrical actuator is configured to apply force to the conveyor through the gear to drive the carriage of the grabber along the track of the mast.

13. The mechanical arm system of claim 12, further comprising an extendable boom having a proximal end and a distal end, the proximal end securable to the refuse vehicle, and the distal end securable to at least a portion of the mast at a distal end.

14. The mechanical arm system of claim 13, wherein the extendable boom comprises a rail attachable to the refuse vehicle and a connecting shaft attachable to the portion of the mast, and wherein a third electrical actuator is configured to move the connecting shaft along the rail.

15. The mechanical arm system of claim 14, further comprising a sliding mechanism including a track extending along the rail and rollers residing between the track and the connecting shaft.

16. A mechanical arm system for a refuse vehicle, the mechanical arm system comprising:

a mast comprising a track having a lower portion and an upper portion, the upper portion defining a profile that curves inwardly towards the refuse vehicle;

a grabber coupled with the mast and configured to grasp a refuse container, the grabber comprising a carriage supporting movable graspers;

an electrically-driven mast actuator configured to move the carriage of the grabber along the track of the mast between an initial position and a dump position, such that:

with the carriage in the initial position on the lower portion of the track, the grabber holds the refuse container in an upright orientation; and with the carriage in the dump position on the upper portion of the track, the grabber holds the refuse container in a tilted orientation;

an extendable boom having a proximal end and a distal end, the proximal end securable to the refuse vehicle, and the distal end securable to at least a portion of the mast at a distal end; and an electrically-driven extension actuator configured to rotate a pinion of a rack-and-pinion assembly to move the extendable boom between a laterally retracted position and a laterally extended position.

17. The mechanical arm system of claim 16, wherein the extendable boom comprises a rail attachable to the refuse vehicle and a connecting shaft attachable to the portion of the mast, and wherein the electrically-driven extension actuator is configured to move the connecting shaft along the rail.

18. The mechanical arm system of claim 17, further comprising a sliding mechanism including a track extending along the rail and rollers residing between the track and the connecting shaft.

19. The mechanical arm system of claim 18, further comprising a control system configured to control the electrically-driven mast actuator and the electrically-driven extension actuator to drive the carriage of the grabber and the extendable boom through predefined movements.

* * * * *